United States Patent [19]

Chiu

[11] Patent Number: 5,002,981
[45] Date of Patent: Mar. 26, 1991

[54] HIGH STRENGTH CARBONACEOUS CEMENT

[75] Inventor: Charles C. Chiu, Strongsville, Ohio

[73] Assignee: UCAR Carbon Technology Corporation, Danbury, Conn.

[21] Appl. No.: 280,974

[22] Filed: Dec. 7, 1988

[51] Int. Cl.⁵ .................... C09J 11/04; C09J 171/14; C09J 179/08

[52] U.S. Cl. .................................. 523/141; 523/144; 524/500; 524/538; 524/542; 525/426

[58] Field of Search ................ 523/141, 144; 524/500, 524/538, 542; 525/410, 411, 422, 426, 471, 537

[56] References Cited

U.S. PATENT DOCUMENTS

| | | | |
|---|---|---|---|
| 2,909,450 | 10/1959 | Goldstein | 524/593 |
| 3,441,529 | 4/1969 | Tyler | 260/19 |
| 3,725,333 | 3/1973 | Adkins | 524/594 |
| 4,915,874 | 4/1990 | Nadkarni | 524/495 |

FOREIGN PATENT DOCUMENTS 090043  6/1982  Japan .
763406  9/1980  U.S.S.R. .

OTHER PUBLICATIONS

Derwent Abstracts 73-76807 u/50.

Primary Examiner—John C. Bleutge
Assistant Examiner—David Buttner
Attorney, Agent, or Firm—E. Lieberstein

[57] ABSTRACT

A carbonaceous cement for joining carbon and graphite shapes contains carbonaceous particles, a furan and catalyst, and a thermosetting resin resistant to high temperatures when curved. The cement forms bonds of superior strength at high temperatures encountered during curing of high-performance composites.

13 Claims, No Drawings

HIGH STRENGTH CARBONACEOUS CEMENT

FIELD OF THE INVENTION

This invention relates to a cement for bonding together carbonaceous structures.

BACKGROUND OF THE INVENTION

It is known in the art to bond carbonaceous shapes together to form assemblies such as refractory linings in metallurgical equipment and cupolas in blast furnaces. These shapes have been bonded with a carbonaceous cement containing, for example, carbonaceous particles, a furan derivative, and a thermosetting phenolic resin. An example of such a cement is disclosed in U.S. Pat. No. 3,441,529, to L. W. Tyler.

Machined graphite shapes are used in the aerospace industry as molds, and the like, for the production of composite structures. These graphite shapes are often very large. For example, some of the graphite molds are large enough to form an entire wing structure. Because of the size of these graphite molds, it is necessary to form these structures from a cement bonded assembly of smaller graphite shapes. A problem with these assemblies, is that the strength of the joints between the individual graphite shapes is often insufficient, resulting in early failure of the mold. The curing temperatures for high-performance composite materials used in the aerospace industry are often as high as 450° C. At these high curing temperatures, conventional carbonaceous cements degrade and their bond strength is, therefore, seriously reduced. As a result, the strength of the joints at curing temperatures is often less than a fourth of the strength of the graphite material used to fabricate the assemblies.

OBJECTS OF THE INVENTION

It is, therefore, an object of the invention to provide a carbonaceous cement of superior strength which maintains its strength at the high temperatures used for curing high-performance composites.

Other objects of the invention will become evident in the description below.

SUMMARY OF THE INVENTION

An embodiment of the invention is a carbonaceous cement paste composition comprising finely divided carbonaceous particles, a high temperature thermosetting polymeric resin which is thermally stable up to 500° C. in its cured state, a thermosetting furan selected from the group, furfural, and furfuryl alcohol, and a heat-activated catalyst for the thermosettng furan.

The finely divided carbonaceous particles may be any carbon or graphite material. Suitable carbonaceous materials include graphite flour, petroleum coke flour, carbon black, pitch coke flour, calcined lampblack flour, and the like. Preferred carbon blacks are gas blacks, which are made by the passage of natural gas over hot refractories. A suitable carbon black is available under the Trademark "Thermax," from Cancarb Co., Medicine Hat, Alberta, Canada.

Suitable amounts of the carbonaceous particles in the cement of the invention are from about 20 wt. % to about 85 wt. %, preferably from about 55 wt. % to about 85 wt. %. Most preferably, the carbonaceous particle component of the cement of the invention is a mixture of coke flour and Thermax carbon black, with the coke flour being present in an amount of from about 40 wt. % to about 50 wt. % and the Thermax carbon black being present in an amount of from about 10 wt. % to about 35 wt. %, based upon the weight of the cement.

The high-temperature resin in the composition of the invention is a resin which is stable in its cured state at temperatures up to about 500° C. By stable, it is meant that there is insignificant degradation of the properties of the cement or resin, particularly the strength, at temperatures up to 500° C. In addition, the resin, before it is cured, should be a homogeneous liquid r be soluble in a solvent to form a homogeneous liquid. This is necessary to allow the combining of the high-temperature resin with the other components of the cement to form a paste-like cement mixture.

Suitable high-temperature resins include, for example, polyimides, polybenzimidazoles, bismaleimides, polyarylketones, and polyphenylene sulfides. Preferred high-temperature resins are fluorinated polyimides.

The amount of high-temperature resin in the cement may be from about 5 wt. % to about 30 wt. %, preferably from about 10 wt. % to about 20 wt. %.

The liquid thermosetting furan is furfural or furfuryl alcohol. The thermosetting furan should also be liquid to allow formation of a paste-like cement mixture. In addition, the thermosetting furan preferably acts as a solvent to the high-temperature resin to further assist in formation of a paste-like mixture. Furfuryl alcohol is a preferred thermosetting furan because of its known compatibility with carbon and graphite.

The cement of the invention typically contains from about 20 to about 45 wt. % of the thermosetting furan, preferably from about 30 to about 40 wt %. of the thermosetting furan, based upon the weight of the cement.

The carbonaceous cement of the invention also contains a heat activated catalyst to catalyze the thermosetting furan when the cement is heated. The most suitable catalysts are acidic catalysts, such as mineral acids, strong organic acids, Lewis acids and acyl halides. Co-reactive catalysts such as phthalic anhydride may also be utilized. Illustrative of the many catalysts that can be used are the following: toluene sulfonic acid, phenol sulfonic acid, acid chlorides, benzene sulfonic acid, sulfonic acid salts, phthaloyl chloride, hydrochloric acid, phosphoric acid, maleic acid, sulfuric acid and zinc chloride.

The cement of the invention is produced, by mixing the ingredients together by any suitable method using known equipment for mixing paste-like materials. The order in which the components are mixed is not critical, except the heat-activated catalyst for the thermosetting furan should preferably be added last, either by mixing all the components and lastly adding the catalyst, or by separately forming a catalyst-activated thermosetting furan mixture of the catalyst and the furan, and adding this mixture to a premixture of the other components of the cement.

A catalyst-activated, heat-curable furan can be prepared by admixing at ambient temperature a major proportion of, for example, furfuryl alcohol and a minor proportion of the heat activated catalyst and water. Typically an aqueous zinc chloride solution catalyst (50 wt. % $ZnCl_2$) is used in an amount of about 2 wt. % to about 10 wt. % catalyst solution, based upon the weight of the furfuryl alcohol.

The procedure for using the cement of the invention, is to apply the cement to graphite surfaces to be bonded, join the surfaces together, and heat the resulting assembly to a temperature to cure the cement. Preferably a compressive load is applied to the joint after the surfaces are joined together. The joint is heated to a temperature sufficient to cure the cement and bond the surfaces together. The temperature sufficient to cure the cement is a temperature at which cement composition begins to rapidly polymerize to form a cross-linked structure. A suitable curing temperature can be determined from the temperature of the first exotherm peak on a differential scanning calorimetry (DSC) analysis curve, and selecting a temperature near or above the temperature of the peak. After curing, the assembly of graphite shapes joined by the cement of the invention is preferably post-cured at a temperature equal to or greater than the highest temperature the assembly is expected to encounter in use.

DESCRIPTION OF THE INVENTION

In the preferred embodiment of the invention, the carbonaceous particles are provided by a mixture of coke flour, and carbon black. The coke flour is preferably "100" coke flour (100% of the flour passing through a 200 mesh screen). The carbon black is preferably Thermax carbon black.

The high-temperature resin is preferably a fluorinated polyimide. A preferred fluorinated polyimide is available under the trademark "Thermid FA- 700" from National Starch and Chemical Corporation, Bridgewater, N.J. Thermid FA-700 fluorinated polyimide is a preimidized thermosetting fluorinated, acetyleniccapped aromatic polyimide.

The thermosetting furan is preferably furfuryl alcohol catalyzed by an acidic catalyst, preferably an aqueous solution of zinc chloride.

Before application of the cement to surfaces to be joined, the surfaces should be shaped by grinding or machining to form a close fit. Preferably, the surfaces are planar, and are preferably ground to a fine tolerance with a high finish. In the typical practice of the invention, it is preferred to maintain a surface finish which allows a joint thickness of about 0.002 inches.

Any known procedure for applying the cement to the surfaces is suitable, such as, for example, brushing or wiping, or by using trowels or spatulas. An excess of cement is preferably applied to allow cement to penetrate pores of the graphite surface and to compensate for cement flowing from the joint surfaces when the surfaces are joined.

After the surfaces are coated with the cement, the surfaces are aligned and joined together. After joining, it is preferable to slide, back and forth, one or both of the surfaces along the plane of the joint to reduce the thickness of the cement layer between the joined surfaces. In a preferred practice, the surfaces are so slid until the surfaces "lock", i.e., when layer of cement between the surface becomes sufficiently thin such that its lubricating action is substantially lost. After joining of the surfaces, the resulting joint is preferably placed under compression, typically about 2 to 3 psi. The joint is compressed by any suitable means, for example, by applying weights, by clamps, by hydraulic presses, or the like.

The cement is cured by heating the assembly, preferably with the joint under compression, to a temperature sufficient to cure the cement. For the preferred fluorinated polyimide/furfuryl alcohol system shown in the examples, the cure temperature is about 130° C. The heating rate should be sufficiently slow to avoid excessive thermal stresses in the joint. Typically, a heating rate of 25° C./hour is suitable. In addition, the cure temperature should be maintained for a sufficient length of time to insure complete curing or polymerization and crosslinking of the cement.

Preferably, the cured joint is heated in a non-oxidizing atmosphere to post-cure the cement. The non-oxidizing atmosphere may be nitrogen, a noble gas, or any suitable non-oxidizing gas or combination of gasses. The post-cure temperature should generally be near or higher than the service temperature of the joint. The non-oxidizing atmosphere may be at atmospheric pressure, or at a super-atmospheric pressure.

EXAMPLE 1

Graphite shapes were joined into assemblies using a carbonaceous cement of the invention and also a comparative carbonaceous cement representative of carbonaceous cements used in the prior art. The joints of the assemblies were then tested for strength. The formulations of the cement of the invention and the comparative cement are shown below in Table I, showing the amounts of the components in wt. % of the total composition. The fluorinated polyimide was Thermid FA-700 fluorinated polyimide, referred to above. The phenolic resin was available from Union Carbide Corporation, Danbury, Conn., under the tradename "BRP-4401". The zinc chloride was an aqueous solution containing 50 wt. % $ZnCl_2$. The oil used in the comparative cement was a purified petroleum-based oil. The cements were produced by mixing measured amounts in a Hobart mixer, adding the zinc chloride catalyst component last.

TABLE I

| Carbonaceous Cement Formulations | | |
|---|---|---|
| | Comparison (wt. %) | Invention (wt. %) |
| 100 Coke Flour | 34.6 | 33.1 |
| Thermax | 15.0 | 14.2 |
| Phenolic | 15.2 | — |
| Fluorinated Polyimide | — | 14.5 |
| Oil | 1.9 | — |
| Furfuryl Alcohol | 30.4 | 35.4 |
| Zinc Chloride | 2.9 | 2.8 |

Each graphite assembly was formed by fabricating two test blocks with the dimensions, $2\frac{1}{2}'\pm1/16'\times4\frac{1}{2}'\pm1/16'\times3'\pm0.005$ inches. One of the $2\frac{1}{2}'\times4\frac{1}{2}'$ faces on each block, which was across the grain of the graphite, was prepared for bonding by finishing the surface to 63 MIF (microinch finish).

A liberal amount of cement was applied to each of the bonding surfaces of the two test blocks, and worked into the surface with a stiff brush. Using a spatula or trowel, a smooth layer of cement, 1/32' to 1/16' thick was then applied to the bonding surfaces, with a buildup of cement in the corners to compensate for excessive flow of cement from the corners.

The surfaces were then aligned in opposition to one another in a horizontal plane and pressed together. The top test block was slid back and forth until the joint "locked", i.e. when the layer of cement decreased sufficiently such that lubricating effect of the cement between the blocks was essentially lost.

The assembly was then placed into an oven with the joint in a horizontal plane, and a 25 pound weight was placed on top of the assembly to provide a 2.2 psi pressure upon the joint. The thickness of the joint was about 0.002 inches. The assembly was then heated in the oven to 130° C. at a rate of 25° C./hour with an eight hour hold at 130° C.

Each assembly was tested by first cutting the assembly into four 1'×1'×4½' standard flex bars, with cuts perpendicular to the plane of the joint. Two specimens from each assembly were post-cured by heating to 450° C. at a rate of 25° C./hour with an eight hour hold period at 450° C. The post-cured specimens were then loaded at a temperature of 400° C. to failure according to the procedure ASTMD-790, "Three-point load flexural strength determination." The average flexural strength for the cement of the invention was 3454 psi, which was 140% higher than the average flexural strength for the conventional cement, which was 1411 psi.

EXAMPLE II

Two graphite shapes were bonded by the cement of the invention to form a graphite molding tool, dimensioned approximately 2'×30'×48', with a bond line extending along the length of the tool. The tool was exemplary of a graphite tool used in the aerospace industry for forming high-performance composites. A tool was assembled using the cement of the invention of Example I. For comparison, another tool was assembled using the conventional cement of Example I. The procedure for assembly of both tools was essentially the same as in Example I, except a hydraulic device was used to apply pressure to the joint. The joints of the tools were tested for flexural strength by cutting samples from near the end of the tool and across the bond line, and testing the samples as in Example I above. The joint of the tool using the cement of the invention had a flexural strength of 2500 psi, compared to a flexural strength of 1000 psi for the tool bonded with the conventional cement.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A carbonaceous cement paste composition comprising finely divided carbonaceous particles and a resin binder system composed of a high-temperature polymeric resin binder which is thermally stable up to 500° C. in its cured state selected from the group consisting of polyimides, polybenzimidazoles, bismaleimides, polyarylketones, polyphenylene sulfides and mixtures thereof and a thermosettable furfuryl alcohol for substantially dissolving said resin, and a heat-activated catalyst for effecting thermosetting of said furfuryl alcohol upon heating said cement with said resin binder system being present in an amount of at least about 20 weight percent of the carbonaceous cement.

2. The carbonaceous cement of claim 1 wherein the high temperature polymeric resin is a fluorinated polyimide.

3. The carbonaceous cement of claim 1 wherein said furfuryl alcohol is present in an amount from about 20 weight percent to about 45 weight percent, based upon the weight of the carbonaceous cement.

4. The carbonaceous cement of claim 1 wherein said furfuryl alcohol is present in an amount from about 30 weight percent to about 40 weight percent, based upon the weight of the carbonaceous cement.

5. The carbonaceous cement of claim 1 wherein the high-temperature polymeric resin is present in an amount from about 5 weight percent to about 30 weight percent, based upon the weight of the cement.

6. The carbonaceous cement of claim 1 wherein the high-temperature polymeric resin is present in an amount from about 10 weight percent to about 20 weight percent based upon the weight of the cement.

7. The carbonaceous cement of claim 1 wherein the carbonaceous particles are present in an amount from about 20 weight percent to about 85 weight percent, based upon the weight of the cement.

8. The carbonaceous cement of claim 1 wherein the carbonaceous particles are present in an amount from about 55 weight percent to about 85 weight percent, based upon the weight of the cement.

9. The carbonaceous cement of claim 1 wherein the carbonaceous particles comprise coke flour and carbon black.

10. The carbonaceous cement of claim 9 wherein the coke flour is present in an amount of from about 40 weight percent to about 50 weight percent, and the carbon black is present in an amount of from about 10 weight percent to about 35 weight percent, based upon the weight of the cement.

11. The carbonaceous cement of claim 1 wherein the heat-activated catalyst is zinc chloride.

12. The carbonaceous cement of claim 1 wherein the heat-activated catalyst is an aqueous solution of zinc chloride in an amount of about 2 weight percent to about 10 weight percent catalyst solution, based upon the weight of the furfuryl alcohol.

13. The carbonaceous cement of claim 12 wherein the aqueous solution of zinc chloride comprises 50 weight percent zinc chloride, based upon the weight of the solution.

* * * * *

UNITED STATES PATENT AND TRADEMARK OFFICE
CERTIFICATE OF CORRECTION

PATENT NO. : 5,002,981
DATED     : March 26, 1991
INVENTOR(S) : Charles C. Chiu

It is certified that error appears in the above-identified patent and that said Letters Patent is hereby corrected as shown below:

Column 4, line 49, "2½'±1/16' x 4½'±1/16' x 3'±" should read --2½"±1/16"x4½"±1/16"x3"±--.

Column 4, line 50, "2½'x4½'" should read --2½"x4½"--.

Column 4, line 57, "1/32' to 1/16'" should read --1/32" to 1/16"--.

Column 5 line 6 "1'x1'x4½'" should read --1" x 1" x 4½"--.

Signed and Sealed this

Twenty-second Day of September, 1992

Attest:

DOUGLAS B. COMER

Attesting Officer     Acting Commissioner of Patents and Trademarks